(12) United States Patent
Terada (10) Patent No.: US 8,756,506 B2
(45) Date of Patent: Jun. 17, 2014

(54) IMAGE REPRODUCTION APPARATUS AND IMAGE REPRODUCTION PROGRAM

(75) Inventor: Masahiro Terada, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1369 days.

(21) Appl. No.: 11/582,314

(22) Filed: Oct. 18, 2006

(65) Prior Publication Data

US 2007/0089061 A1 Apr. 19, 2007

(30) Foreign Application Priority Data

Oct. 19, 2005 (JP) ................................. 2005-304888

(51) Int. Cl.
*G11B 27/00* (2006.01)
(52) U.S. Cl.
USPC ........... 715/723; 715/716; 715/730; 715/746; 715/786; 715/833; 715/974
(58) Field of Classification Search
USPC .......... 715/716, 833, 974, 746, 730, 723, 786
See application file for complete search history.

(56) References Cited

U.S. PATENT DOCUMENTS

| | | | |
|---|---|---|---|
| 6,108,001 A * | 8/2000 | Tuttle ............................. | 715/730 |
| 7,117,453 B2 * | 10/2006 | Drucker et al. ................ | 715/833 |
| 2003/0154190 A1 * | 8/2003 | Misawa et al. ................... | 707/1 |
| 2004/0141000 A1 * | 7/2004 | Baba et al. ..................... | 345/716 |
| 2004/0193723 A1 * | 9/2004 | Kabatani ........................ | 709/231 |
| 2004/0257440 A1 * | 12/2004 | Kondo et al. ................... | 348/94 |
| 2005/0084136 A1 * | 4/2005 | Xie et al. ....................... | 382/107 |
| 2005/0155086 A1 * | 7/2005 | Schick et al. .................. | 725/153 |
| 2008/0092051 A1 * | 4/2008 | Sidon et al. .................... | 715/731 |

FOREIGN PATENT DOCUMENTS

| | | |
|---|---|---|
| JP | 07-2033373 | 8/1995 |
| JP | 2002-112087 | 4/2002 |

* cited by examiner

*Primary Examiner* — Doon Chow
*Assistant Examiner* — Shourjo Dasgupta
(74) *Attorney, Agent, or Firm* — McGinn IP Law Group, PLLC (57) ABSTRACT

In an image reproduction window, an image reproduction area in which images are reproduced, and an operating area in which a slide bar is displayed are provided. When a slider of the slide bar is moved, the number of images to be displayed in one frame in the image reproduction area is increased or decreased in accordance with a position of the slider. The number of images in one frame increases as a displacement amount of the slider increases. When the slider is moved within a range in which the number of images to be displayed in one frame does not change, only a frame change interval is changed while the number of images in one frame is unchanged.

9 Claims, 6 Drawing Sheets

FIG.3

| GEAR NUMBER GN | NUMBER OF IMAGES N | FRAME CHANGE INTERVAL T (SEC) | NUMBER OF IMAGES DISPLAYED IN ONE MINUTE (FRAME DISPLAY RATE) |
|---|---|---|---|
| 0 | 1 | ∞ | — |
| 1 | 1 | 4 | → 15 |
| 2 | 1 | 2 | → 30 |
| 3 | 1 | 1.5 | → 40 |
| 4 | 4 | 4 | → 60 |
| 5 | 4 | 3 | → 80 |
| 6 | 4 | 2.5 | → 96 |
| 7 | 9 | 5 | → 108 |
| 8 | 9 | 4 | → 135 |
| 9 | 9 | 3 | → 180 |
| 10 | 25 | 6 | → 250 |
| 11 | 25 | 3 | → 500 |

| GEAR NUMBER GN | NUMBER OF IMAGES N | FRAME CHANGE INTERVAL T (SEC) | IMAGE SIZE | FRAME DISPLAY RATE |
|---|---|---|---|---|
| 0 | 1 | ∞ | LARGE | 0 |
| 1 | 4 | 4 | LARGE | 60 |
| 2 | 16 | 16 | MEDIUM | 60 |
| 3 | 25 | 25 | SMALL | 60 |

35

IMAGE REPRODUCTION APPARATUS AND IMAGE REPRODUCTION PROGRAM

BACKGROUND OF THE INVENTION

1. Field of the Invention

The present invention relates to an image reproduction apparatus and an image reproduction program for displaying a multi-image frame on a monitor screen.

2. Description of the Related Art

Still images captured by a digital still camera, hereinafter simply referred to as images, are usually printed out on photographic papers or the like. The images can also be displayed on a monitor screen of a personal computer, which is used as an image viewer. In most cases, an image viewer software has a slide show function which automatically displays a plurality of images sequentially at specified time intervals. By using this function, the plurality of images can be viewed with a simple operation.

To view the images as a slide show, a display time of each image, that is, a frame change interval needs to be set up. For instance, to view the images, the frame change interval is set long. On the other hand, to search an intended image among a plurality of images, the frame change interval is set short. Note that it is also possible to change over the frames manually by a frame advance function.

Japanese Patent Laid-Open Publication No. 07-203373 discloses an image reproduction apparatus which displays plural images (thumbnail images) in a matrix for an image search. This image reproduction apparatus helps to perform the image search efficiently by changing the frame having plural images to a next frame having other images. Further, Japanese Patent Laid-Open Publication No. 2002-112087 discloses an image reproduction apparatus which is capable of changing over between a normal search mode and a fast search mode. In the normal search mode, each image is shifted one by one in a frame so that the earliest image is disappeared from the frame, and instead a new image is introduced. In the fast search mode, the images are changed over on a frame basis in the same manner as in Japanese Patent Laid-Open Publication No. 7-203373.

In many cases, the image viewer software has a function to change not only the frame change interval, but also the number of images displayed in one frame as described above. To search an intended image in a short time, a user needs to individually adjust the frame change interval and the number of images displayed in one frame, so as to find an optimum combination of the frame change interval and the number of images.

However, when the number of images displayed in one frame is changed, time required for viewing all the images displayed in one frame is also changed. For instance, when the number of images displayed in one frame is increased, the time required for viewing the displayed images is also increased. Accordingly, it becomes necessary to extend the frame change interval. Thus, every time the number of images displayed in one frame is changed, the frame change interval needs to be changed, and this is troublesome and inconvenient.

SUMMARY OF THE INVENTION

In view of the foregoing, an object of the present invention is to provide an apparatus and a program capable of easily adjusting a combination of the number of images displayed in one frame and a frame change interval.

In order to achieve the above and the other objects, an image reproduction apparatus according to the present invention includes an input detection section for detecting input information that designates the number of images to be displayed in one frame, an image output section for reading the designated number of images from a memory device, and arranging the images in one frame, and then outputting the arranged images to the monitor, and a frame change interval determining section for determining an interval to changeover the frames in accordance with the designated number of images.

The input detection section detects a displacement amount of an operating device which is moved from its origin point to designate the number of images. The frame change interval determining section determines the frame change interval such that a frame display rate represented by a product of the number of images and a reciprocal number of the frame change interval is increased as the displacement amount increases.

The input detection section detects a number-changing displacement amount necessary for changing the number of images displayed in one frame, and a number-fixed displacement amount within a range of which the number of images is not changed. The frame change interval determining section shortens the frame change interval when the number-fixed displacement amount is detected.

In a preferred embodiment of the present invention, a slide bar displayed on the monitor is moved in accordance with the displacement amount detected by the input detection section. The frame change interval determining section extends the frame change interval in accordance with an increase in the number of images displayed in one frame. At that time, the frame change interval determining section determines the frame change interval such that the frame display rate represented by a product of the number of images displayed in one frame and a reciprocal number of the frame change interval is kept constant.

An image reproduction program according to the present invention includes the following steps: detecting input information which designates the number of images to be displayed in one frame, determining a display period of the frame on the monitor in accordance with the designated number of images, reading the designated number of images from a memory device and arranging the images in the frame, displaying the frame with the images arranged therein on the monitor, and changing over the frames every time the display period passes.

According to the present invention, since an appropriate frame change interval is set up in response to the change of the number of images in one frame, it becomes unnecessary to independently set up the number of images and the frame change interval. Accordingly, the present invention achieves a simple data input without inputting the above two types of information. Further, the searching of the images is expedited since the images are easily viewable.

Since the displacement amount of the operating device from the origin point is detected as the input information, it becomes unnecessary to input the number of images as numeric data so that the operation is simplified. In addition, since the frame display rate is increased as the displacement amount increases, the adjustment of the frame display rate can be comprehended intuitively.

The number-changing displacement amount and the number-fixed displacement amount are detected, and the frame change interval is changed when the operating device is operated at the number-changing displacement amount. When the displacement amount is gradually increased, the frame change interval is gradually shortened while the number of images in one frame is kept constant. When the displacement amount is further increased, the frame change interval is extended according to the increase in the number of images in one frame. Thereby, frame display rate is finely adjusted without loss of viewablity, and a plurality of images can be viewed in a short time, reducing the burden on eyes of the user.

Since the displacement amount is shown on a slide bar in the monitor, an easily viewable GUI is realized where the result of the operation is immediately viewed on the monitor.

Since the frame change interval is extended when the number of images in one frame is increased, the time for displaying the frame is extended so that the displayed images can be viewed in sufficient time. Thereby, it becomes possible to prevent redundant display of the images, that is, displaying the frame with a few numbers of images for a long time. Also, it becomes possible to prevent difficulty in viewing images caused by displaying the frame with a plurality of images only for a short time.

Moreover, when the number of images in one frame is changed, the frame change interval is changed to keep the frame display rate constant. Therefore, the most viewable display configuration is provided.

BRIEF DESCRIPTION OF THE DRAWINGS

The above objects and advantages of the present invention will become apparent to a person skilled in the art from the following detailed description of the preferred embodiments of the invention when read in conjunction with the accompanying drawings, in which.

DETAILED DESCRIPTION OF THE PREFERRED EMBODIMENT(S)

Figure 1:
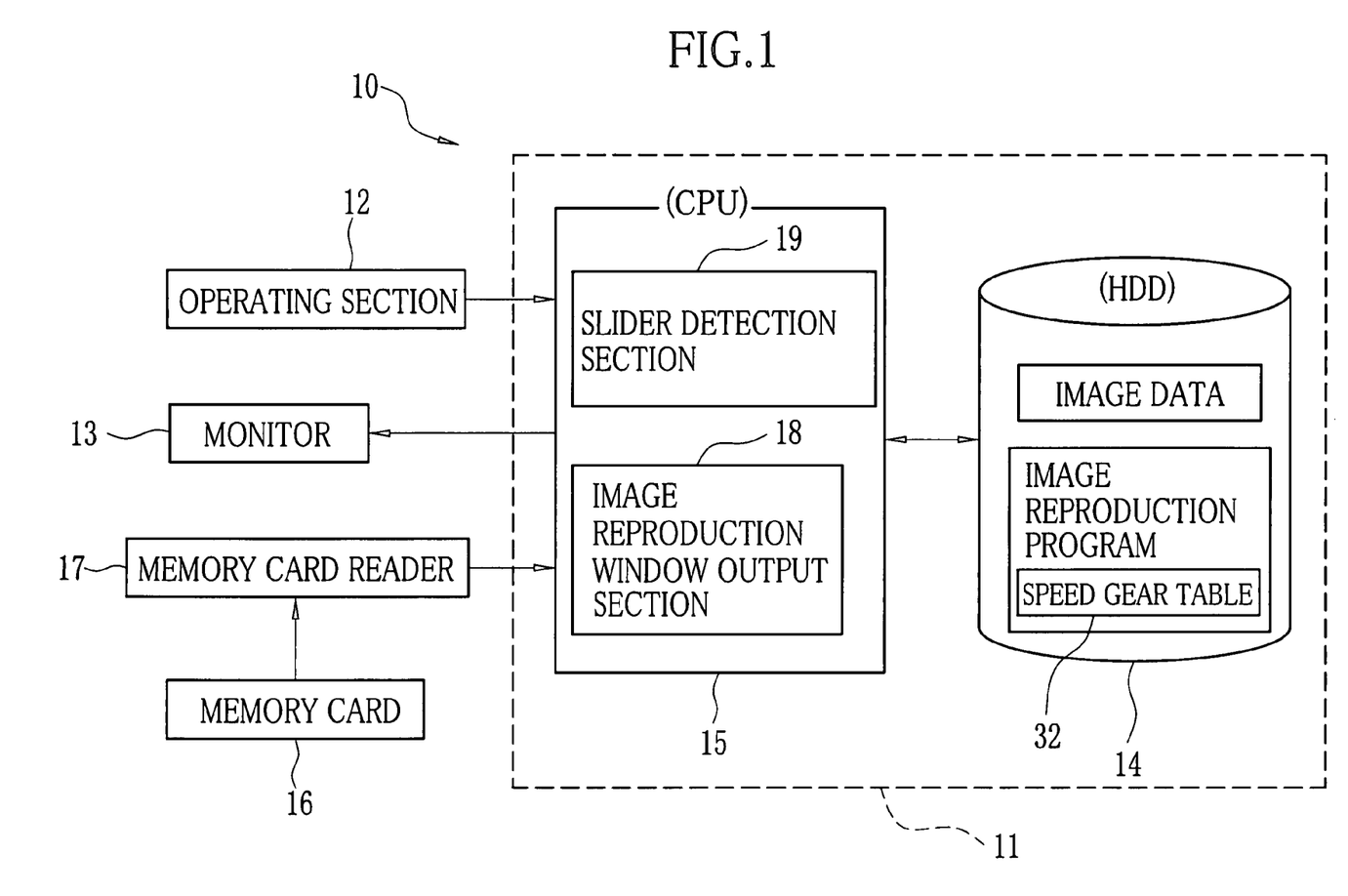
FIG. 1 is a block diagram illustrating schematic configuration of an image reproduction apparatus.

In FIG. 1, an image reproduction apparatus 10 is constituted of a main unit 11, an operating section 12 connected to the main body 11, and a monitor 13. The image reproduction apparatus 10 is, for instance, a general-purpose personal computer or a work station installed with an image reproduction program. The main unit 11 includes a memory device 14 constituted of a hard disk drive (HDD) and the like in which the image reproduction program is stored, and a CPU 15 which executes the image reproduction program stored in the memory device 14. The operating unit 12 is constituted of pointing devices such as a mouse. The monitor 13 is, for instance, an LCD panel.

A memory card 16 is a removable recording medium in which image data of still images captured by, for instance, a digital still camera is stored. A memory card reader 17 which reads the image data stored in the memory card 16 is connected to the main unit 11. The read image data is stored in the memory device 14. By executing the image reproduction program, the CPU 15 functions as an image reproduction window output section 18 and a slider detection section 19.

The image reproduction window output section 18 generates an image reproduction window, and outputs the generated image reproduction window to the monitor 13.

Figure 2:
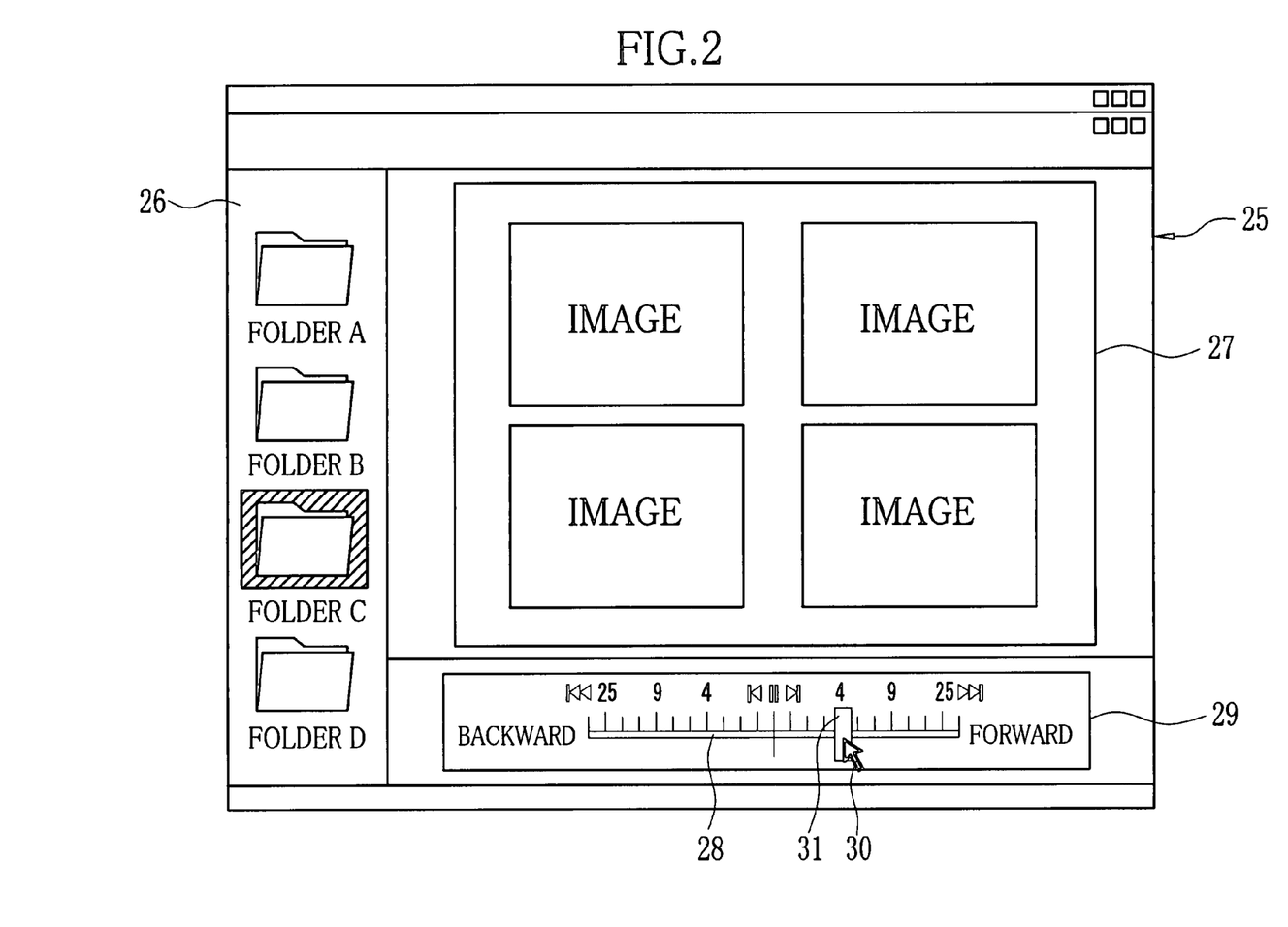
FIG. 2 is an explanatory view of an image reproduction window.

In FIG. 2, the image reproduction window 25 displayed on the monitor 13 is constituted of a folder display area 26, an image reproduction area 27, and an operating area 29. The folder display area 26 displays virtual folder icons individually coupled to separate directories in which the image data is stored. The image reproduction area 27 reproduces the designated number of images and switches them at specified time intervals. The operating area 29 displays a slide bar 28 which is used for designating the number of reduced images to be contained in one frame in the image reproduction area 27.

A slider 31 moves along the slide bar 28 by a known dragging operation in which a pointer 30 displayed in the image reproduction window 25 is placed on the slider 31 and dragged by operating the operating section 12. A displacement amount (a slide amount) of the slider 31 is detected by the slider detection section 19. The image reproduction window output section 18 makes reference to the detected displacement amount. Based on the detected displacement amount, the image reproduction window output section 18 reproduces the images in the image reproduction area 27 in a display configuration previously determined in accordance with the displacement amount.

According to the position of the slider 31, the image reproduction window output section 18 makes reference to a speed gear table 32 to determine the display configuration of the images in the image reproduction area 27. The speed gear table 32 is previously defined in the image reproduction program. To reproduce the images in the image reproduction area 27, the image data of the designated directory in the folder display area 26 is read and reproduced.

Figure 3:
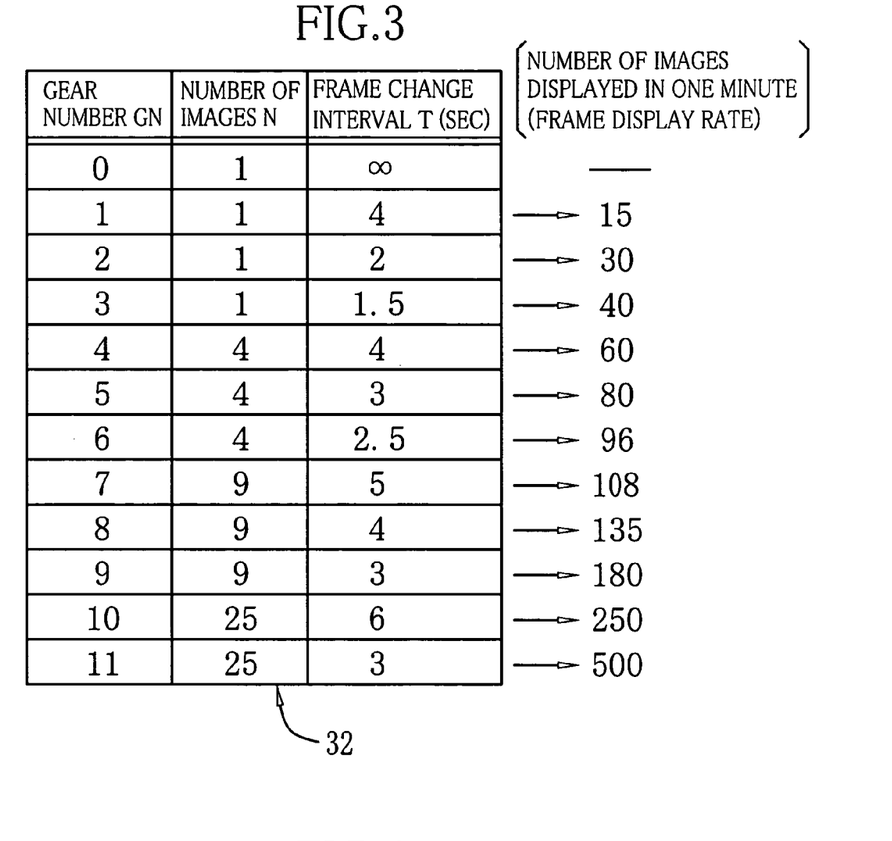
FIG. 3 is a schematic view of a speed gear table.

In FIG. 3, the speed gear table 32 contains, for instance, 12 levels of gear numbers corresponding to the position of the slider 31. To each gear number, number of images N displayed in one frame in the image reproduction area 27 and a frame change interval T specifying an interval to change over the frames each of which displays the N numbers of images are previously assigned. The gear number takes a larger value as the displacement amount of the slider 31 from an origin point increases. The number of images N, for instance, takes four values, for instance, 1, 4, 9, and 25 that are square numbers. When the N is 1, the size of the image displayed in the image reproduction area 27 becomes the largest. The size of the image displayed in the image reproduction area 27 becomes smaller as the number of images N increases. When plural images (reduced images) are displayed in the image reproduction area 27, the images are arranged in a square matrix.

In the speed gear table 32, the number of images N and the frame change interval T are determined such that the number of images displayed per unit time, for instance, one minute (hereinafter referred to as a frame display rate) increases with the increase of the gear number (see FIG. 3). In the speed gear table 32, some of the gear numbers have the same number of images displayed in one frame. In that case, the frame change interval T is reduced as the gear number increases so as to increase the frame display rate.

Figure 4:
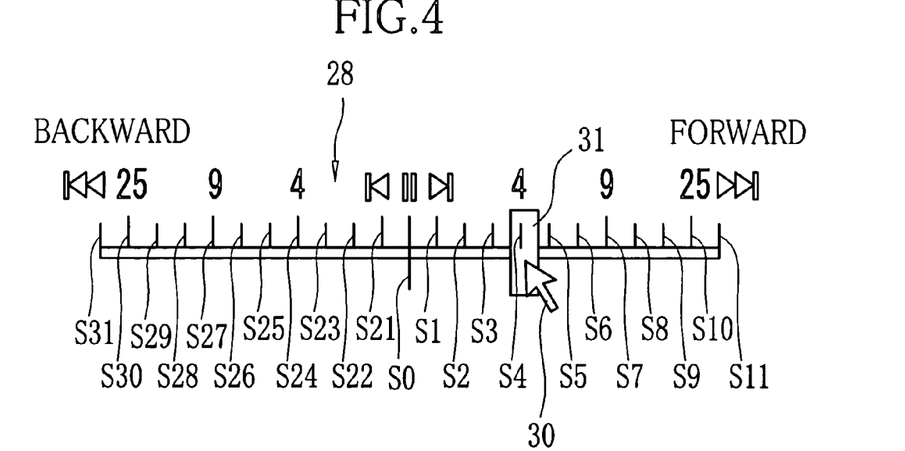
FIG. 4 is an enlarged view of a slide bar.

In FIG. 4, the slide bar 28 has tick marks corresponding to the gear numbers in the speed gear table 32. A tick mark S0 at the center of the slide bar 28 corresponds to the gear number GN0, and a tick mark S11 at the right end of the slide bar 28 corresponds to the gear number GN11. Tick marks S4, S7, and S10 labeled with numbers correspond to the gear numbers GN4, GN7 and GN10. For instance, when the slider 31 is moved to the right, the number of images displayed in one frame increases every time the slider 31 reaches the tick mark with number. Tick marks S1, S2, and S3 between the tick marks S0 and S4 correspond to the gear numbers GN1, GN2, and GN3. Tick marks S5 and S6 between the tick marks S4 and S7 correspond to the gear numbers GN5 and GN6. The tick marks S8 and S9 correspond to the gear numbers GN8 and GN9.

Likewise, the tick marks S21 to S31 on the left side of the tick mark S0 correspond to the gear numbers GN1 to GN11. When the slider 31 is moved to the right side of the tick mark S0, the images are reproduced in normal order from the beginning according to, for instance, a file name or the like. On the contrary, when the slider 31 is moved to the left side of the tick mark S0, the images are reproduced in inverse order to the above.

Figure 5:
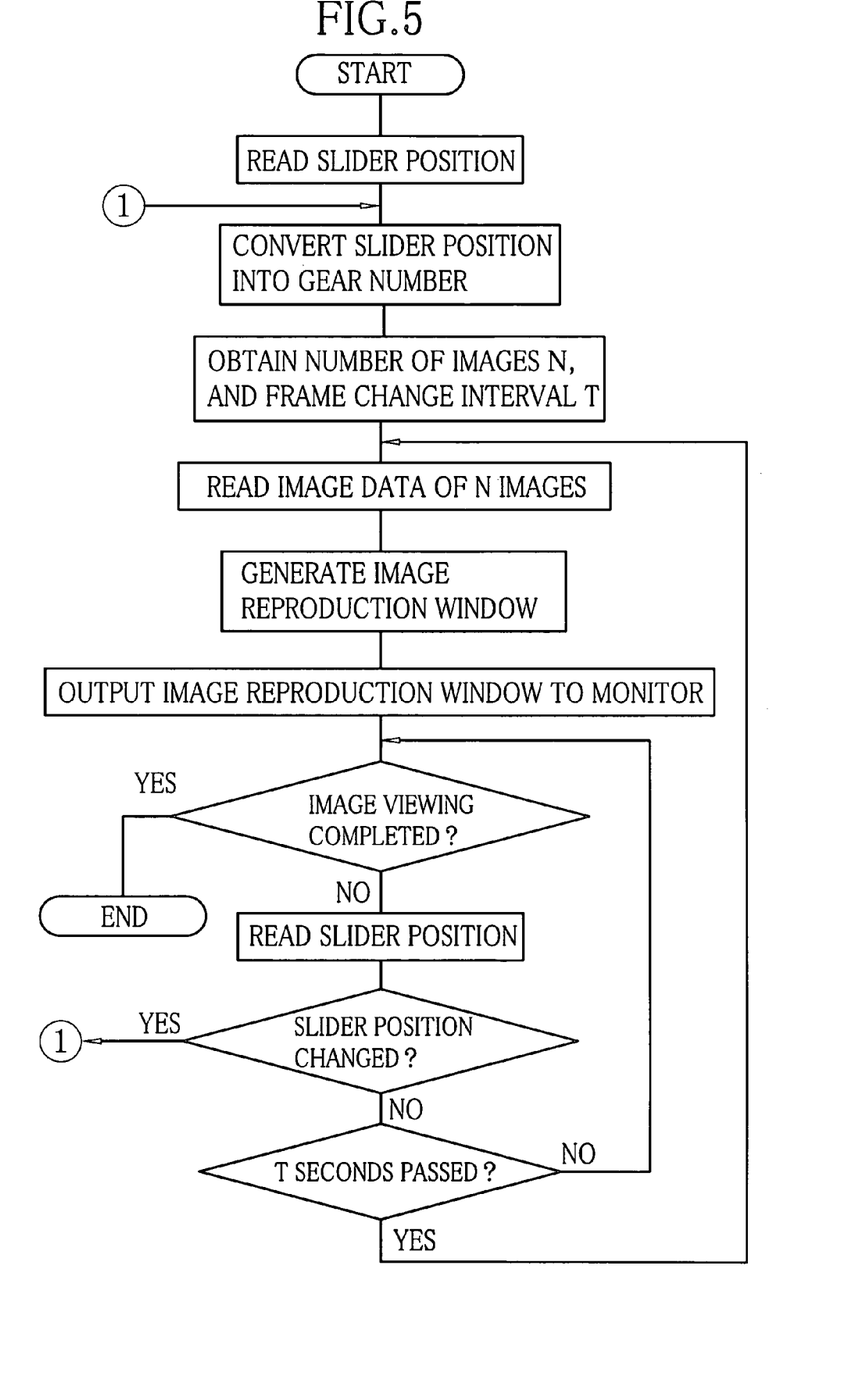
FIG. 5 is a flow chart of an image reproduction process.

Next, the operation of the present invention is described. In FIG. 5, the image data stored in the memory card 16 is read by the memory card reader 17 and stored in a specified directory in the memory device 14. When the image reproduction program is executed, the image reproduction window output section 18 generates the image reproduction window 25, which is then displayed on the monitor 13.

The image reproduction window 25 is divided into the folder display area 26, the image reproduction area 27, and the operating area 29. In the folder display area 26, the user selects the folder icon coupled to the directory with the desired image data. In the operating area 29, in an initial state, the slider 31 is at the tick mark S0, that is, the center position of the slide bar 28. The image reproduction window output section 18 obtains the gear number GN0 from the position of the slider 31 and makes reference to the speed gear table 32. The image reproduction window output section 18 reads the number of images N and the frame change interval T from the speed gear table 32. If the slider 31 is kept at the tick mark S0, the image reproduction is in a pausing state in which one image is kept displayed as one frame without changing over to the next frame in the image reproduction area 27.

When the operation is performed to move the slider 31 to the right, the displacement amount is detected by the slider detection section 19. The image display reproduction window output section 18 makes reference to the detected displacement amount and moves the slider 31 accordingly. The image reproduction window output section 18 converts the position of the slider 31 into the corresponding gear number and makes reference to the speed gear table 32. The image reproduction window output section 18 reads the number of images N to be displayed in the image reproduction area 27 and the frame change interval T of the corresponding gear number from the speed gear table 32. Thereby, the image reproduction window output section 18 reproduces one frame having the N numbers of images in the image reproduction area 27 for T seconds. If the slider 31 is not moved during T seconds, the next N numbers of images are read and arranged in a matrix. This next frame is then displayed for T seconds, and the slide show is continued.

Figure 6:
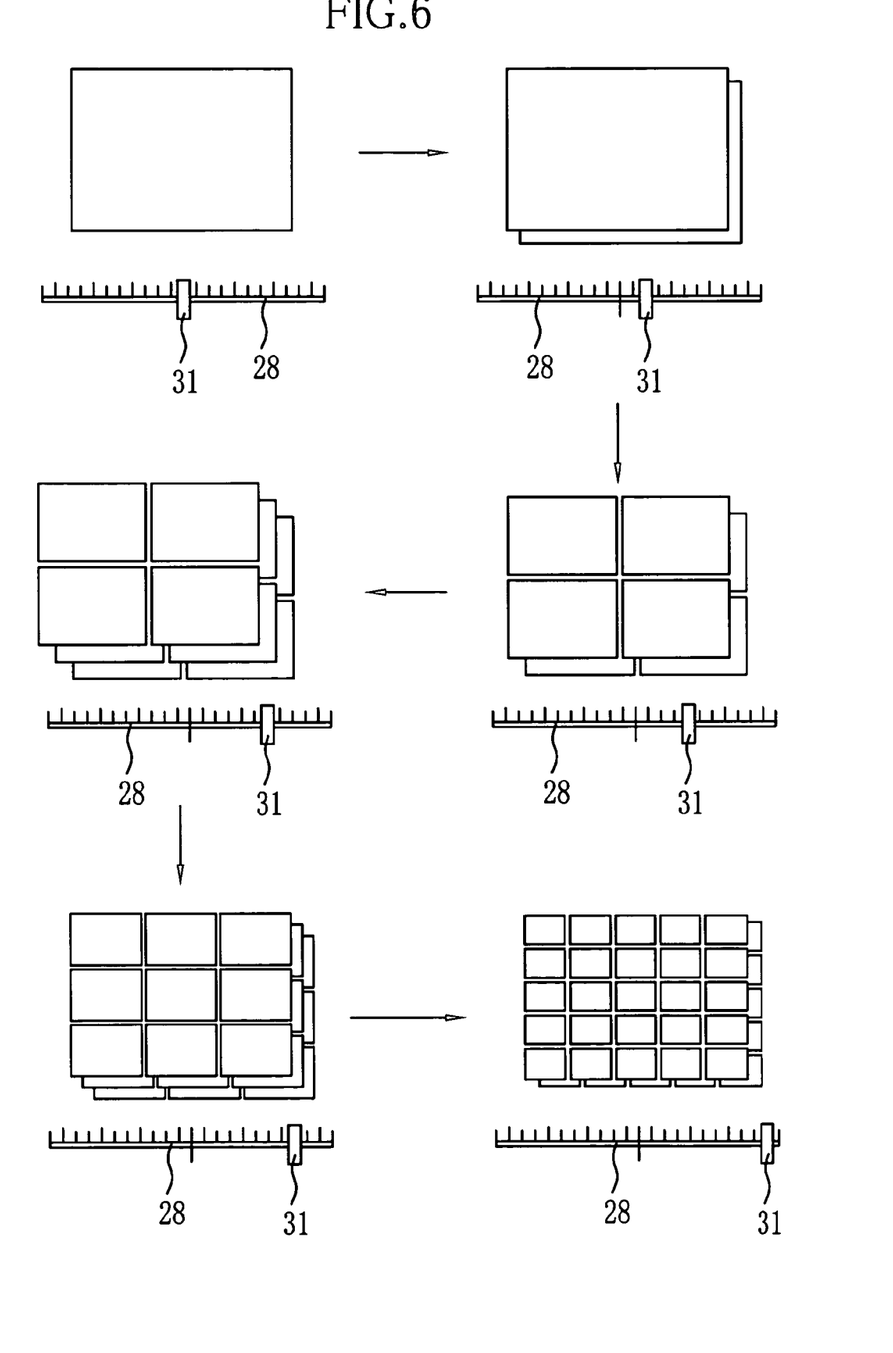
FIG. 6 is an explanatory view illustrating an example of changes in image reproduction speed with respect to a displacement amount of a slider.

In FIG. 6, in the speed gear table 32, the frame display rate increases as the displacement amount of the slider 31 increases in the right direction. To search the intended image from the plurality of images, the user only needs to move the slider 31 to select the most easily viewable display configuration.

For instance, when the slider 31 is moved to the tick mark S1, frames each of which has one large-size image are reproduced at the frame change intervals of 4 seconds. When the slider 31 is moved to the tick mark S2, the number of the image displayed in one frame is not changed, but the frame change interval is changed to two seconds. When the slider 31 is moved to the tick mark S4, 4 images arranged in the matrix are displayed in one frame in the image reproduction area 27 at the frame change intervals of 4 seconds. When the slider 31 is moved to the tick mark S6, the number of images displayed in one frame is not changed, but the frame change interval is changed to 2.5 seconds. When the slider is moved to the tick mark S7, 9 images are displayed in one frame at the frame change intervals of 5 seconds.

As described above, the number of images displayed per unit time (the frame display rate) is increased as the slider 31 is moved away from the tick mark S0 on the slide bar 28. Further, at the tick marks between the tick marks S4 and S7, and those between the tick marks S7 and S10, only the frame change interval T is shortened while the number of images N displayed in one frame is remained the same. In other words, when the slider 31 is moved slowly from the tick mark S0, the changeover of the frames becomes gradually faster while one image is displayed in each frame. When the frame change interval T reaches a minimum value, the number of images N in one frame is increased to 4, and at the same time, the frame change interval T is increased. When the slider 31 is further moved to the right, the frame change interval T is gradually shortened while the number of images N in one frame remains at 4. When the frame change interval T reaches a minimum value, the number of images N in one frame is increased to 9, and at the same time, the frame change interval T is increased. When the slider 31 is further moved to the right, the frame change interval T is shortened while the number of images N in one frame remains at 9, and so on. Note that when the slider 31 is moved to the left of the tick mark S0, the frame display rate increases in the same manner as above. However, the images are reproduced in the inverse order. The user can adjust the frame display rate and select the most easily viewable display configuration by moving the slider 31 while viewing the images in accordance with the purpose of reproducing the images, that is, to perform the slide show or to search the images.

Figure 7:
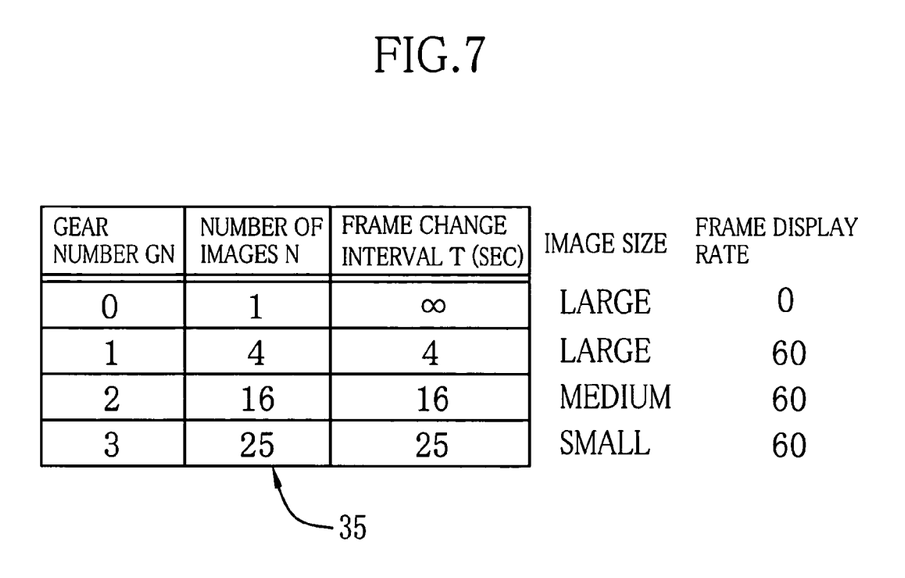
FIG. 7 is another example of the speed gear table.

The present invention is not limited to the above embodiment, and changes can be made thereto. For instance, as shown in a speed gear table 35 in FIG. 7, the slide show can be performed at a constant frame display rate by extending the frame change interval T as the number of images N increases. When there are only a few options for the number N as shown in the speed gear table 35, it is also possible to use a pull-down menu instead of the slide bar 28 to select the number of images N.

The operating device for designating the number of images N is not limited to the slider 31 which linearly moves along the slide bar 28. It is also possible to display a dial that rotates to indicate the displacement amount. Further, other than using a graphical user interface (GUI) in which the slide bar 28 or the dial displayed on the monitor 13 is operated by the pointing device such as the mouse, it is also possible to provide an actual slide bar or a dial.

In the case the frame display rate is increased as the displacement amount of the slider 31 is increased, the slide show with the larger increment in the frame display rate can be performed by gradually shortening the frame change intervals T even when the number of images N is increased. It is also possible to use a speed gear table whose values are arbitrarily determined by the user. Further, it is also possible to make the input detection section to detect the displacement amount of the slider 31 with higher accuracy so that the number of images N and the frame change interval T can be obtained by computations. The present invention is not limited to the above embodiment in which the personal computer is used as the image viewer. It is also possible to use the digital still camera which is capable of performing the slide show of the images, a DVD player which performs the slide show of the image data recorded in the optical disk such as a DVD, or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image reproduction apparatus having a memory device for storing images and a monitor, comprising:
    an input detection section for detecting input information designating a number of images to be displayed in one frame;
    an image output section for reading said designated number of images from said memory device, arranging said images with a size corresponding to said designated number in said one frame, and outputting said arranged images to said monitor; and
    a frame change interval determining section for determining an interval to changeover said frames in accordance with said designated number of images to be displayed in one frame, so that a plurality of images are automatically displayed sequentially at the determined interval;
    a slide bar comprising first tick marks for number of images which indicate the number of images displayed in one frame and second tick marks for frame change interval which specify the interval to change over the frames, the first tick marks being provided on a straight line at a regular interval from an origin point, and the second tick marks being provided between the first tick marks; and
    a slider which is movable along the slide bar, the number of images and the frame change interval being set according to the first and second tick marks corresponding to a position of the slider,
    wherein the input detection section detects the number of images set by the slider as the input information, and
    wherein the frame change interval determining section determines the frame change interval set by the slider as the interval to changeover the frames.

2. An image reproduction apparatus according to claim 1, wherein said image reproduction apparatus further includes an operating device for designating said number of images, and said input detection section detects a displacement amount of said operating device from an origin point as said input information when said operating device is operated, and said frame change interval determining section determines said frame change interval such that a frame display rate represented by a product of said number of images and a reciprocal number of said frame change interval is increased as said displacement amount increases.

3. An image reproduction apparatus according to claim 2, wherein said input detection section detects a number-changing displacement amount necessary for changing said number of images displayed in said one frame, and a number-fixed displacement amount within a range of which said number of images is not changed, and said frame change interval determining section shortens said frame change interval when said number-fixed displacement amount is detected.

4. An image reproduction apparatus according to claim 2, wherein said monitor displays a slide bar, which is moved in accordance with said displacement amount detected by said input detection section.

5. An image reproduction apparatus according to claim 1, wherein said frame change interval determining section extends said frame change interval in accordance with an increase in said number of images displayed in said one frame.

6. An image reproduction apparatus according to claim 5, wherein said frame change interval determining section determining said frame change interval such that said frame display rate represented by a product of said number of images displayed in said one frame and a reciprocal number of said frame change interval is kept constant.

7. The image reproduction apparatus according to claim 1, further comprising an operating device for designating said number of images,
    wherein a displacement amount of the operating device, from an origin point, is detected as the input information.

8. The image reproduction apparatus according to claim 1, wherein when the number of images in one frame is changed, the interval to changeover said frames is changed.

9. The image reproduction apparatus according to claim 1, wherein the slide bar sets the number of images displayed in one frame and the frame change interval at a same time.

* * * * *